Oct. 31, 1950 E. PETERSON 2,527,650

SYNCHRONIZATION OF PULSE TRANSMISSION SYSTEMS

Filed March 31, 1949 2 Sheets-Sheet 1

INVENTOR
E. PETERSON
BY Harry C. Hart
ATTORNEY

Oct. 31, 1950 E. PETERSON 2,527,650

SYNCHRONIZATION OF PULSE TRANSMISSION SYSTEMS

Filed March 31, 1949 2 Sheets-Sheet 2

INVENTOR
E. PETERSON
BY Harry C. Hart
ATTORNEY

Patented Oct. 31, 1950 2,527,650

UNITED STATES PATENT OFFICE 2,527,650

SYNCHRONIZATION OF PULSE TRANSMISSION SYSTEMS

Eugene Peterson, New York, N. Y., assignor to Bell Telephone Laboratories, Incorporated, New York, N. Y., a corporation of New York Application March 31, 1949, Serial No. 84,683

4 Claims. (Cl. 179—15)

This invention relates to communication by pulse techniques and particularly to the synchronization of receiver apparatus with transmitter apparatus.

A pulse code transmission system is one in which instantaneous amplitude values or "samples" of a message, for example the voice wave of a telephone conversation originating at a transmitter station, are translated into code pulse groups, transmitted in that form to a receiver station, and there decoded or translated into the original message form for delivery to the listener. Such systems have certain known advantages as compared with more conventional systems, among which are their remarkable freedom from interference and their easy adaptability to multiplexing by time division. However, for correct reconstitution of a message and, in the case of a time division multiplex system for correct distribution of the several messages among the several listeners, the receiver apparatus must operate in substantially perfect synchronism with the transmitter apparatus; i. e., it must operate not only at the same frequency or speed, but it must also maintain a preassigned phase relation to a very precise degree. To this end it is known to transmit, in addition to the message information, certain synchronizing information, for example in the form of marker pulses recurring in a preassigned sequence, which hold the receiver apparatus in step with the transmitter apparatus at the correct frequency and in the correct phase or angular alignment. It is also a most desirable feature that the receiver apparatus shall return to correct alignment with the transmitter apparatus, after a momentary interruption of the service, as rapidly as possible. One obvious expedient for securing this result involves the provision, at the receiver, of timing apparatus such as a multivibrator circuit whose natural frequency is slightly lower than that of corresponding timing apparatus at the transmitter, yet not so low but that it can be held in step with the transmitter apparatus. When the phases are correct, the receiver remains locked in step with the transmitter as by the application of the transmitted marker pulses to the receiver timing apparatus. When for any reason the phases are not correct, as for example, when the system is first put in operation or after an accidental interruption of service, the receiver timing apparatus runs at its lower natural frequency so that its phase lag with respect to the transmitter apparatus increases continuously until alignment is once more obtained, at which time the marker pulse, if sufficiently strong, seizes control and holds the receiver in step with the transmitter. Thereupon synchronous operation recommences.

The design of a system of that kind involves making a compromise between two incompatibles. For certainty of locking in step after a temporary drop-out, the frequency difference between the transmitted pulsing frequency and the free-running frequency of the receiver multivibrator must be small, and the synchronizing or marking pulse must be strong. This means a slow receiver drift during the drop-out and the allotment of a substantial amount of frequency space to the synchronizing pulses. If an effort be made to conserve frequency space by weakening the synchronizing pulses or to reduce drifting time by increasing the multivibrator frequency difference, then there arises the possibility of an overshoot with resulting loss of time.

In an application of J. G. Kreer and E. Peterson, Serial No. 776,280, filed September 26, 1947, there is described a system which avoids these difficulties, providing secure restoration of synchronism after it has once been lost by a drop-out or interruption of service or otherwise. In that system a rotative member of the receiver apparatus, for example a ring circuit of intercoupled multivibrators, is never allowed to drift, but is held locked in synchronism at all times with a sequence of pulses applied to it. Normally, the pulses of this sequence recur at the basic pulse repetition rate of the system; but when the receiver is out of synchronism, one pulse in a specified number is skipped, blocked, or suppressed. This allows the receiver to drop back substantially instantaneously by one pulse position, step, or "notch," and so avoids the danger of any overshoot. Restoration of synchronism thus takes place in a time which, in a simplex system or a multiplex system of a small number of channels, for example 12 or less, is negligibly small. But with a multiplex system having a number of channels of the order of 100 or so, the time consumed in restoration of synchronism may be excessive. For example, with a system of 100 channels, each employing pulse transmission in the 7-digit code, there are 700 pulse positions in each frame, one of which is the marker pulse and is assigned for phase alignment purposes. It has been found that if the marker pulses are to be distinguished from message pulses with certainty, the pulse-suppression process cannot safely be carried out more than once in about 10 successive frames, so that, as a result, only one pulse out of 7,000 pulses is skipped or suppressed. Inevitably, therefore, in a large scale time division multiplex system, restoration of synchronism by this method is slow.

It is a principal object of the present invention to accelerate the reestablishment of synchronous operation of a pulse code communication receiver with its transmitter after it has once been lost. This object is attained in accordance with the invention in one of its forms by causing the receiving timing mechanism and in particular the rotative member which controls it to drop back in phase by one pulse position for each two successive frames. Each step backward is produced, as in the case of the apparatus described in the aforementioned application of J. G. Kreer and E. Peterson, by blocking or withholding a single driving pulse from the receiver timing mechanism. In the present system, unlike the prior system, the withholding action is not the result of the comparatively slow build-up of a signal in a reactive element such as a filter, but results from the direct comparison of an intermediate sequence of pulses derived from and related to the pulses of the incoming train, regularly sampled under control of the rotative member, with a sequence of pulses generated by the rotative member. The pulses of the latter sequence recur regularly at the frame rate, and in a phase which is dependent on the phase lag of the rotative member with respect to the incoming pulse train. The pulses of the former sequence recur, in general, in a random fashion dependent on the signal amplitudes which, as members of permutation code pulse groups, they represent. Under one condition and one condition only, they recur regularly at the frame rate; and this condition is that in which the sampling of the pulses of the incoming pulse train takes place at the instants at which the marker pulses occur. Under this condition, the pulses of the two trains may be balanced in a suitable network to give a zero output which is indicative of the correct phase conditions, and synchronous operation proceeds in the manner described in the aforementioned application of J. G. Kreer and E. Peterson. Under any other condition, since the pulses of the locally generated train recur regularly at the frame rate and the pulses of the intermediate sequence derived from the incoming pulse train recur irregularly, a situation soon arises in which the pulse of one train is not balanced by a corresponding pulse of the other train, whereupon the balancing network delivers an output which is applied, by way of a suitable switching device, to momentarily open the path by which the pulses derived from the incoming train are applied to drive the rotative member. Thus, under all conditions but one, the driving pulses are momentarily blocked from the rotative member, one in each frame or so, thus allowing the rotative member to drop back by one pulse position or "notch" as described above.

With a sequence of marker pulses which recur regularly once in each frame, it is possible to allow the receiver timing mechanism, when out of frame, to drop back by one pulse position in each frame. However, it has been found that such marker pulses are open to the disadvantage that they are, for many purposes, easily confused with message pulses. It has been found advantageous to employ a sequence of marker pulses which recur regularly once in each two successive frames, i. e., a marker pulse is present in alternate frames and absent in the intervening frames. In other words, its repetition rate is one half of the frame frequency. With this arrangement, two frames must elapse before it can be definitely established whether the receiver timing mechanism is in correct phase or not. For this purpose it is preferred to cause the drop-back to occur, not by one notch in each frame, but by one notch in each two successive frames. This is arranged, in accordance with the illustrated form of the invention, by the inclusion of a pulse feedback path which disables the pulse balancing mechanism for a single pulse period immediately following a pulse period in which it has delivered a non-zero output. Even with the limitation that the drop-back of one notch occurs only once for two successive frames, the system provides a substantial reduction in the time required to reestablish synchronous operation.

The rapid action of the apparatus to be described results from the fact that it recognizes a very brief unbalance between the pulses of the intermediate sequence and the locally generated pulses. Such a brief unbalance may occur, during synchronous operation, as a result of a momentary failure of transmission. To prevent the receiver apparatus from treating this condition as though synchronism had been lost, the invention provides, as a further feature, a slow-release system which prevents the application of unbalance control pulses from initiating the phase restoration process until such control pulses have recurred in sufficient numbers to mark the condition as one of true loss of synchronism as distinguished from momentary interruption of transmission.

The invention will be fully apprehended from the following detailed description of an illustrative embodiment thereof taken in conjunction with the appended drawings in which.

Figure 1:
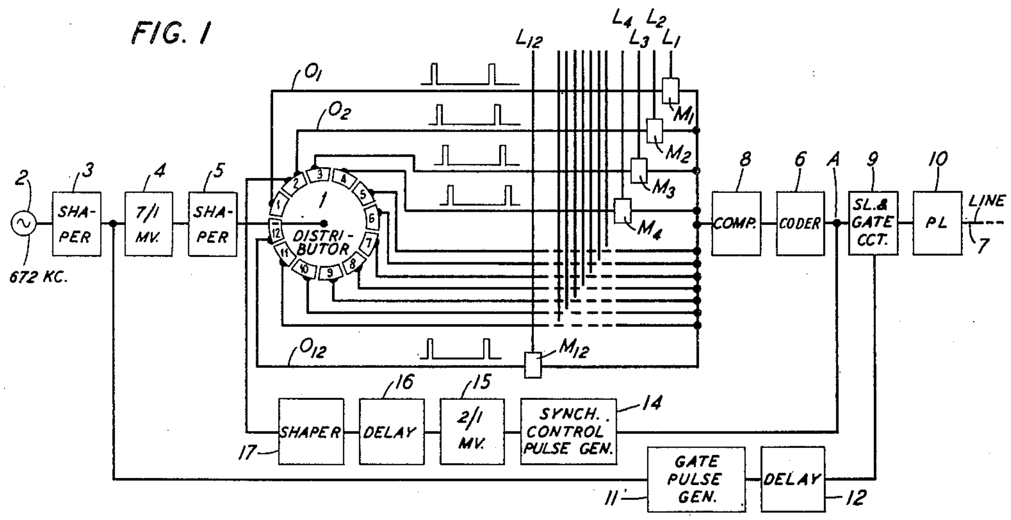
Fig. 1 is a schematic block diagram of transmitter apparatus suitable for use in connection with the invention.

Referring now to the figures:

Fig. 1 shows pulse code transmission apparatus which is the same as that described in the aforementioned application of E. Peterson and J. G. Kreer to which reference may be made for details. In brief, a number of messages, originating for example with a number of independent talkers such as telephone subscribers, appear on a like number of incoming lines $L_1$ to $L_{12}$, each of which is connected to one of a bank of modulators $M_1$ to $M_{12}$ which are actuated in cyclic serial order by output pulses of a distributor 1. This distributor may conveniently be a ring circuit of intercoupled multivibrators. It may be driven by a train of pulses whose recurrence rate is the product of the number of channels (in the present example, twelve) by the channel sampling rate, for example 8 kilocycles per second, or 96 kilocycles per second. Output pulses of a basic timing source 2 of, for example 672 kilocycles per second are first standardized by a shaper 3 and supplied to a frequency divider 4, for example a multivibrator, which derives pulses at the seventh subharmonic of the basic pulse rate. These in turn are standardized by a shaper 5 and applied to the distributor 1. The basic pulse rate, 672 kilocycles, is the product of the sampling rate by the number of channels and by the number of code digits to be employed, e. g. 8 kc.$\times$12$\times$7=672 kc.

The sequential speech samples of the several talkers produced in this manner are then applied to a coder 6 which converts them into binary permutation code pulse groups for transmission, by way of any suitable medium represented by an outgoing line 7, to a receiver station. With the twelve channels assumed, and a seven-digit binary permutation code, there are 12$\times$7=84 such pulses in each full cycle of distributor operation or "frame." To improve the signal-to-noise ratio on the line an amplitude compressor 8 may be interposed ahead of the coder. Individual pulses of the code groups may then be regenerated, as by a slicing and gating circuit 9, to occupy as nearly as possible their correct nominal positions on the time scale, and they may then be lengthened to fill, as nearly as possible, their assigned intervals as by a pulse lengthener 10. The slicing and gating operation may be controlled by a gate pulse generator 11 which is driven by the pulses of the basic timing source 2, a suitable delay device 12 being interposed to balance miscellaneous delays in other parts of the system.

Reference or marker pulses may be generated by a synchronizing control pulse generator 14 which may be a multivibrator under control of a two-to-one frequency divider 15 which, in turn, is controlled by the output of one stage of the distributor 1. These marker pulses are preferably the same in duration and amplitude as the message code pulses, being distinguished from the latter only by virtue of their regular recurrence in alternate frames. Further, they are adjusted in phase by a delay device 16 to occur in the pulse positions occupied by the least significant code elements. In this way the received message quality of the channel in which a marker pulse occurs is degraded only slightly; i. e. from seven-digit quality to six-digit quality.

The train of marker pulses is injected into the outgoing line at the point A.

Figure 2:
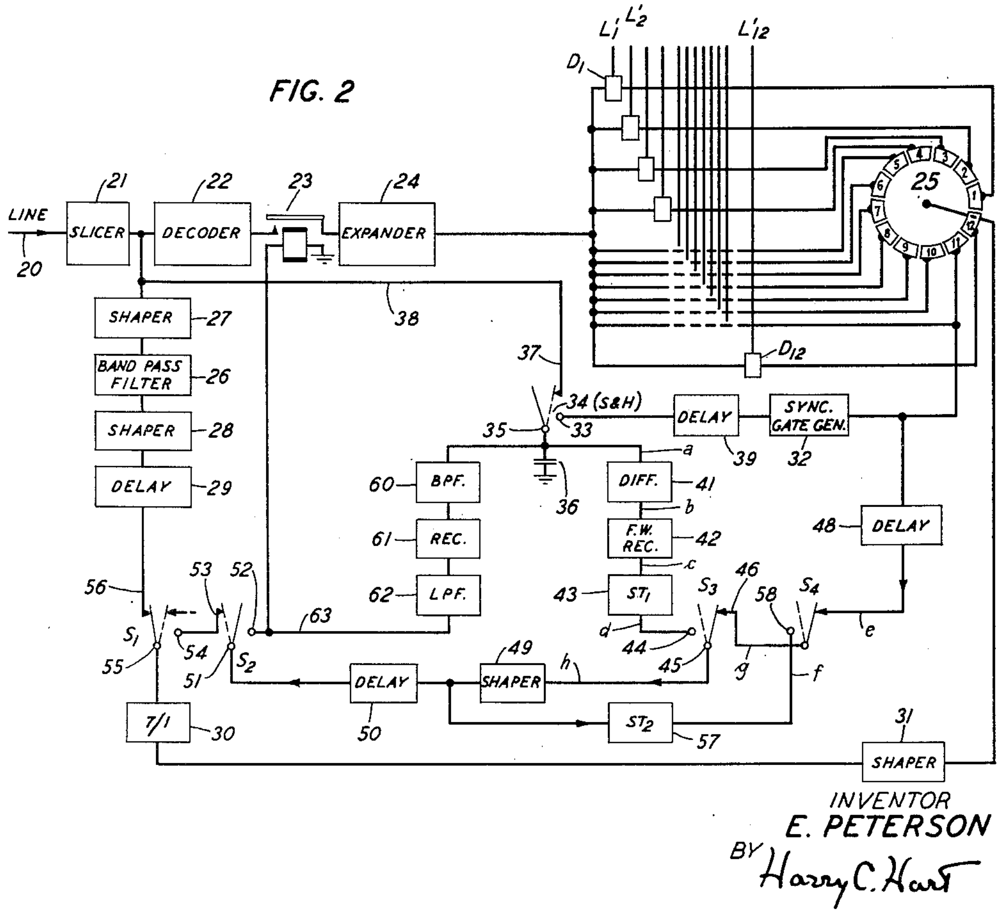
Fig. 2 is a schematic block diagram of receiver apparatus embodying the invention; and, Figs. 3 and 4 are wave form diagrams illustrating the operation of the invention.

After transmission, by radio, wire, or otherwise, to a receiver station shown in Fig. 2, the incoming train of code pulses appears on an incoming line 20. Because they may have been distorted in transmission, they are first standardized in amplitude by a slicer 21 and then applied to a decoder 22. This decoder, which may be of any desired type, translates or converts each separate group of seven binary code pulses into a message sample amplitude to which it corresponds. Assuming the relay-operated switch 23 to be closed, these samples are applied to an expander 24 which corrects the amplitude distortion introduced at the transmitter station by the compressor 8, and they are then applied together to a group of demodulators $D_1$ to $D_{12}$ which are actuated in cyclic serial order by a distributor 25 which, like the distributor 1 at the transmitter terminal, may comprise a ring of intercoupled multivibrators. Thus the message amplitude samples are distributed among the outgoing lines $L_1'$ through $L_2'$. The distributor 25 may be controlled as to timing by the incoming pulse train in the following manner. A basic timing wave of 672 kilocycles is first derived from the incoming code pulses by means of a very narrow band-pass filter 26 which is tuned to the basic timing rate. Units 27, 28 may be interposed, both ahead of this filter and following it, to give the pulses suitable shapes. After the further interposition of a delay device 29 to balance delays in other parts of the system, the resulting 672 kilocycle pulses are applied, by way of a switch $S_1$ to a seven-to-one frequency divider 30, for example a multivibrator, whose output pulses, assuming the switch $S_1$ to be closed, are applied by way of a shaper 31 to the ring distributor 25. Thus the receiver timing and distributing networks run at exactly the same rates as the corresponding networks at the transmitter. It remains to arrange that the phases at the receiver shall exactly correspond to the phases at the transmitter in order that incoming code pulse groups may be correctly decoded and the resulting message amplitude samples correctly distributed to the several outgoing lines, and to insure that, once these phase relations have been upset either by an interruption of service or at the commencement of transmission, they shall be restored to correct alignment with a minimum amount of loss time.

In the aforementioned Kreer-Peterson application, there is described a system for restoring lost phase adjustment between transmitter and receiver. The process carried out by that system involves first comparing the phase of a fixed reference pulse contained in the transmitted pulse train with a fixed reference pulse in the receiver timing frame. If these two pulses coincide for several successive frames, the receiver is held locked to the incoming train and the system operates correctly. If, upon examination of the situation for 10 successive frames it appears that they do not coincide, a single driving pulse is withheld from the rotary distributor, thus allowing it to drop back by one notch. If, upon similar examination of 10 successive frames in the new phase condition, they still do not coincide, the process is repeated, and so on for each new phase condition. Thus the phase lag of the rotative member is progressively increased, at the rate of one notch for each 10 successive frames, until phase coincidence occurs, whereupon the intermittent pulse-blocking process ceases, and the rotative member is driven by and in synchronism with the pulses of the incoming train.

The present invention provides a specific improvement for accelerating the introduction of the required amount of phase lag in order that phase alignment may be more rapidly restored. Like the earlier system, the present invention makes use of a train of regularly recurring pulses whose instants of occurrence are indicative of the phase of the receiver timing apparatus. Each pulse of this sequence is termed a "synchronizing gate pulse," and these synchronizing gate pulses are about 0.25 microsecond in duration, and they are generated with a recurrence rate of 8 kilocycles by a generator 32 controlled by the output of some one stage, for example stage 11, of the receiver ring 25. Each synchronizing gate pulse is applied to the control terminal 33 of a sample-and-hold circuit 34 which may be, for example, an electronic switch, though it is shown symbolically as a simple switch, and to one conduction terminal 35 of which is connected a holding condenser 36. The other conduction terminal 37 of the switch 34 is supplied by way of a conductor 38 from the output of the slicer 21 so that it receives the pulses of the incoming train after slicing. The switch 34 is normally open, and is intermittently closed for a brief instant by application of the synchronizing gate pulse from the generator 32. The action of the delay device 39 is to locate it in the center of a code pulse position which is about 1.5 microseconds in duration. Thus, through the agency of the sample-and-hold circuit 34, the synchronizing gate pulse tests one single code pulse position in each 8 kilocycle frame. If a code pulse is present in this pulse position, a charge is stored on the condenser 36 and is held for one frame period. If no pulse is present in this position in the following frame, the previous charge is quickly dissipated. The voltage of this condenser 36 is applied by way of two control paths. The description of the left-hand control path will be postponed. Referring to the right-hand control path, the condenser voltage is applied successively to a differentiating network 41, a full wave rectifier 42 and a single trip multivibrator 43. The single trip multivibrator 43 which may be of well-known construction is preferably so adjusted that the duration of each of its output pulses is approximately one-sixth of a frame. These pulses are applied to the control terminal 44 of a switch $S_3$ and operate to open this switch and thus to block the path through its conduction terminals 45, 46 and to hold this path blocked for the duration of each output pulse of the single trip multivibrator 43.

When the switch $S_3$ is closed (and assuming the switch $S_4$ which will be described below to be similarly closed), then pulses derived from one stage of the ring distributor 25 pass by way of a delay device 48 through the switch $S_4$ and the switch $S_3$, a pulse shaper 49 and a delay device 50 to the conduction terminal 51 of the switch $S_2$ which is assumed to be closed, and so to the control terminal 54 of the switch $S_1$ to open this switch and thus withhold a single driving pulse from the seven-to-one frequency divider 30, thus causing the ring distributor 25 to drop back one notch relative to the incoming train.

In case the synchronizing gate pulse is testing the marker pulse position, then the condenser 36 is charged and discharged in alternate frames. Thus a voltage having a large 4 kilocycle fundamental component appears across it, as illustrated in curve A of Fig. 3. This gives rise to a sequence of sharp pulses at 8 kilocycles (curve C) at the output of the rectifier 42, and to a like sequence of broader pulses (curve D) at the output of the single trip multivibrator 43 at the same frequency. These pulses operate to open the switch $S_3$ at just such instants as the ring pulses (curve E) reach this switch by way of the switch $S_4$ from the receiver ring circuit, so that the ring circuit pulses (curve E) are blocked from the switch $S_1$. Thus the main driving pulse path is not opened and no driving pulses are blocked. This condition is the one which obtains when the receiver timing apparatus is operating in synchronism with the incoming pulse train and which is depicted graphically in Fig. 3, where a phase coincidence between the pulses of curve D, which represents the output of the single trip multivibrator 43 and pulses of curve E, which represents the sequence of pulses derived from the ring distributor 25 as they appear at the conduction terminal 46 of the switch $S_3$, are fully balanced, so that the switch $S_3$ is opened just before the arrival of one of the ring pulses and held open until it has passed.

Figure 4:
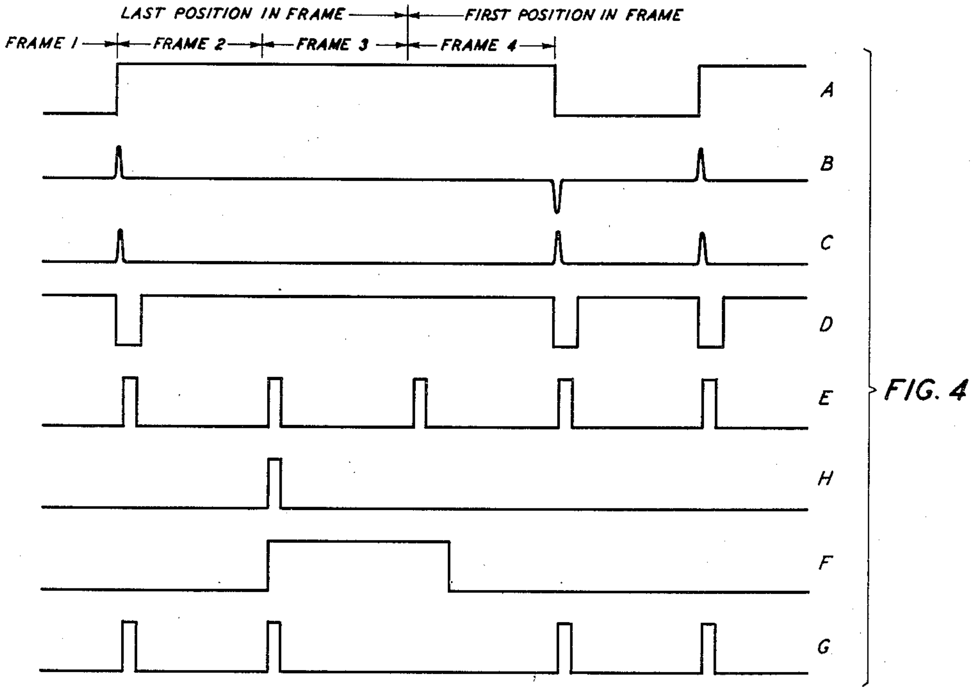

When, however, the receiver timing apparatus is not in synchronism with the incoming pulse train, then voltage pulses of the holding condenser (curve D) are randomly distributed as illustrated in Fig. 4. Referring to this condition, an unbalance will occur from time to time, such that the switch $S_3$ is closed at the time of arrival of a pulse (curve E) from the ring distributor 25. This pulse then passes the switch $S_3$ and the switch $S_2$ to open momentarily the switch $S_1$ and so block a single driving pulse from the receiver ring 25. The situation illustrated in Fig. 4 is that in which a pulse recurs in the same pulse position in two successive frames of the incoming train, so that the output (curve B) of the differentiator circuit 41, and therefore the output (curve D) of the single trip multivibrator 43, remain quiescent for two successive pulse periods, throughout which time the switch $S_3$ thus remains closed. Under these conditions, each one of the unbroken sequence of pulses (curve E) from the receiver ring distributor may pass the switch $S_3$ and so operate to withhold one pulse in each successive frame from the receiver ring 25. However, because of the possibility that, with such a system, the final pulse position of one frame contains a pulse for two successive frames while the initial pulse position of the ensuing frame contains the marker pulse, or the equal possibility of the opposite condition to which the final pulse position of a frame is a blank for two successive frames and the marker pulse position is likewise blank, provision has been made, in accordance with the present invention, to prevent the application to the pulse blocking switch $S_1$ of pulses (curve E) from the receiver ring in adjacent sequence. Thus, referring again to Fig. 2, each time a pulse from the receiver ring 25 passes the switch $S_3$ and so opens the switch $S_1$ in a manner described above, it is also applied to a single trip multivibrator 57 in a feedback path whose output pulse has the duration indicated in Fig. 4 by the curve F. This pulse is applied to the control terminal 58 of the switch $S_4$ and so opens it for a time somewhat longer than one frame period commencing immediately on the passage of a pulse of the sequence E through the switch $S_3$. It thus prevents the ensuing pulse of the train E from reaching the switch $S_3$ and ensures that receiver ring output pulses shall not be applied in immediate succession as blocking pulses to the switch $S_1$. The net result is that the receiver ring pulses (curve E) which pass the switch $S_4$ to reach the switch $S_3$ are as shown in curve G while those which also pass the switch $S_3$ to reach the switch $S_2$ are as shown in curve H.

Figure 3:
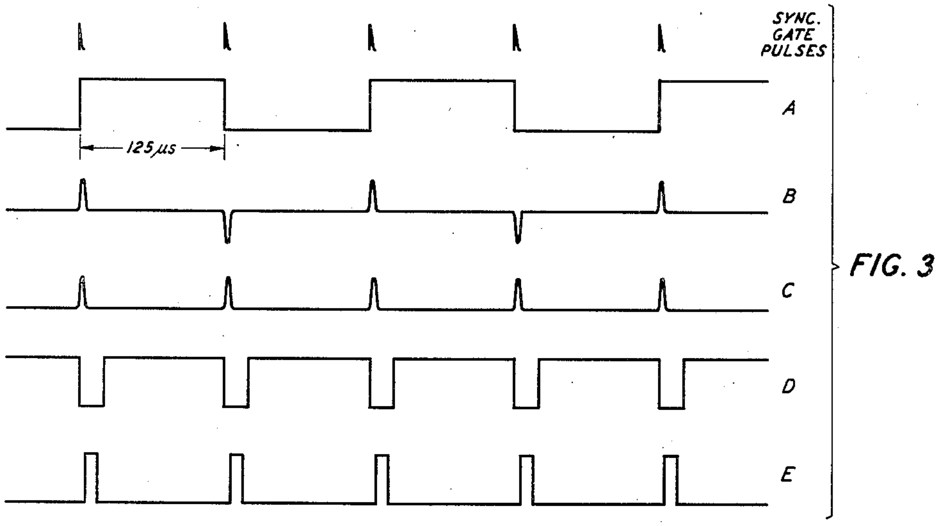

With this system there is substantial assurance that, once the condition represented in Fig. 3 has been established, in which pulses derived from the incoming pulse train are balanced in phase against pulses derived from the ring, so that the switch $S_3$ is opened at just such time as to prevent the passage of ring pulses through this switch, then synchronism is correct.

To minimize the possibilities of loss of synchronism due to a momentary failure of the communication channel, the invention also provides a slow-release system whose function and effect are to maintain synchronous operation despite such a momentary failure. Thus, referring to the left-hand path from the condenser 36, the voltage of this condenser, when the sample-and-hold switch 34 happens to be testing the marker pulse position, contains a large 4 kilocycle fundamental component. A filter 60 whose pass band is centered at 4 kilocycles per second, is connected to this condenser and receives the voltage of this alternating charge. Thus at its output a voltage builds up. When rectified by a rectifier 61 and filtered by a filter 62 this output appears as a negative voltage on a conductor 63. This negative voltage is applied to the control terminal 52 of the switch $S_2$ to hold it open. As above explained, the conduction terminals 51, 53 of the switch $S_2$ are connected in series in the control pulse path from the delay device 50 to the control terminal 54 of the switch $S_1$. Thus when synchronism has once been established, and when, for any reason the pulses of the incoming train are momentarily interrupted, the switch $S_2$ remains open, thus preventing control pulses from reaching the control terminal of the switch $S_1$ to open it, so that the switch $S_1$ remains closed despite such interruption, and so maintains synchronous operation of the receiver ring 25 even though there be an instantaneous unbalance, due to such interruption, between the pulses of the single trip multivibrator 43 (curve D) and the receiver ring output pulses (curve E) so that a pulse is allowed to pass from the receiver ring by way of the switch $S_3$ to one conduction terminal 51 of the switch $S_2$. It does not pass the switch $S_2$ to operate the switch $S_1$ by virtue of the fact that this switch $S_2$ is held open by the output of the reactive elements of the band pass filter 60 in the manner just described. When instead, the sample-and-hold circuit does not happen to be testing the marker pulse position, then the charges on the condenser occur in a random fashion from frame to frame so that the output of the filter is very much reduced as compared with its output when the marker pulse is tested. Under these conditions the switch $S_2$ remains closed in the position indicated on the drawing by the broken line and so permits application of the ring output pulses by way of the switches $S_4$ and $S_3$ to the switch $S_1$ in the manner described above.

When the receiver is correctly phased with respect to the transmitter a negative voltage appears on the conductor 63 in the manner described above. This voltage, in addition to holding the switch $S_2$ open, also closes the switch 23, thereby establishing a path from the decoder 22 to the expander 24. This switch 23 is opened during the hunting process to prevent the delivery of incorrect samples in the demodulators $D_1$ to $D_{12}$ and so to the outgoing subscribers' lines.

While the exemplary embodiment of the invention described above is a permutation code communication system, the invention is also applicable to pulse communication systems in which permutation codes are not employed.

Various modifications of the illustrative examples shown and described above, as well as departures in detail from the apparatus described, will occur to those skilled in the art.

What is claimed is:

1. In a synchronous pulse communication system, receiver apparatus for reconstituting a message from code groups of pulses of an incoming train, one pulse position of each frame of said train being assigned to a marker pulse which is distinguishable from other pulses of the train by virtue of its regular recurrence rate, which apparatus comprises means for deriving from the incoming train a sequence of pulses at the basic pulse repetition rate of said train, a rotative member, means for applying the pulses of said derived sequence to said rotative member to advance said rotative member in step-by-step fashion in synchronism with the transmitted frame, incoming pulse-position sampling means, a path extending from a preassigned output terminal of said rotative member to said sampling means for actuating said sampling means once in each revolution of said rotative member, thereby to derive a sample of a single pulse position of each frame of the incoming train, the location in said frame of the pulse position sampled being dependent on the phase displacement between the rotative member and the transmitter apparatus, the sequence of said samples comprising regularly recurring pulses when, and only when, the pulse position sampled is that to which the marker pulse is assigned, means for deriving from the operation of the rotative member a second pulse sequence, which second sequence comprises regularly recurring pulses whose phases are dependent on the phase alignment of said rotative member, means for comparing the first pulse sequence with the second pulse sequence, means for deriving from said comparison a signal related to the phase difference between said pulse sequences, means for retarding the phase of said rotative member by one pulse position under control of said difference signal, and means for disabling said phase retarding means when said difference signal is reduced below a preassigned level.

2. In a synchronous pulse communication system which includes receiver apparatus for reconstituting a message from code groups of pulses of an incoming train, one pulse position of each frame of said train being assigned to a marker pulse which is distinguishable from other pulses of the train by virtue of its regular recurrence rate, which apparatus comprises means for deriving from the incoming train a sequence of pulses at the basic pulse repetition rate of said train, a rotative member, means for applying the pulses of said derived sequence to said rotative member to advance said rotative member in step-by-step fashion in synchronism with the transmitted frame, incoming pulse-position sampling means, a path extending from a preassigned output terminal of said rotative member to said sampling means for actuating said sampling means once in each revolution of said rotative member, thereby to derive a sample of a single pulse position of each frame of the incoming train, the location in said frame of the pulse position sampled being dependent on the phase displacement between the rotative member and the transmitter apparatus, the sequence of said samples comprising regularly recurring pulses when, and only when, the pulse position sampled is that to which the marker pulse is assigned, means including a path extending from an output terminal of the rotative member for deriving a second pulse sequence, which second sequence comprises regularly recurring pulses whose phases are dependent on the alignment of said rotative member, a switch having conduction terminals and a control terminal, the conduction terminals of said switch being connected in series with the path of the pulses of said second sequence, connections for applying pulses of said first sequence to said control terminal to open said switch momentarily, and means for retarding the phase of said rotative member by one pulse position under control of pulses passing said switch when closed.

3. In combination with apparatus as defined in claim 2, a second switch having conduction terminals and a control terminal, said conduction terminals being connected in series in the path of said second pulse sequence, apparatus for generating a control voltage of duration substantially equal to a frame period on the application to it of a pulse, connections for applying to said generator pulses which pass the first switch, and connections for applying said control voltage to the control terminal of the second switch, whereby the pulse of the second sequence immediately following any pulse of the second sequence which passes the first switch is blocked from the first switch.

4. In a synchronous pulse communication system, apparatus located at a transmitter station for generating an irregular train of message pulses in a regular sequence of frames, apparatus for generating a regular sequence of marker pulses and for interpolating said marker pulses in said message pulse train at regular preassigned intervals in the frame sequence, apparatus for transmitting the resulting pulse train to a receiver station, apparatus located at said receiver station for receiving said pulse train and for reconstituting a message from the pulses of said train, which reconstitution apparatus comprises means for deriving from the incoming train a sequence of pulses at the basic pulse repetition rate of said train, a rotative member, means for applying the pulses of said derived sequence to said rotative member to advance said rotative member in step-by-step fashion in synchronism with said transmitter apparatus, incoming pulse-train-sampling means, a path extending from a preassigned output terminal of said rotative member to said sampling means for actuating said sampling means once in each revolution of said rotative member, thereby to derive a sample of a single pulse position of each frame of the incoming train, the location in said frame of the pulse position sampled being dependent on the phase displacement between the rotative member and the transmitter apparatus, the sequence of said samples comprising regularly recurring pulses when, and only when, the pulse position sampled is that in which the marker pulse was interpolated by the transmitter apparatus, means for deriving from an output terminal of the rotative member a second pulse sequence, which second sequence comprises regularly recurring pulses whose phases are dependent on the phase alignment of said rotative member, means for comparing the first pulse sequence with the second pulse sequence and for deriving a signal related to the difference between said pulse sequences, means for retarding the phase of said rotative member by one pulse position under control of said difference signal, and means for disabling said phase retarding means when said difference signal is reduced below a preassigned level.

EUGENE PETERSON.

REFERENCES CITED

The following references are of record in the file of this patent:

UNITED STATES PATENTS

| Number | Name | Date |
|---|---|---|
| 1,616,808 | Kleinschmidt | Feb. 28, 1927 |
| 1,658,660 | Traver | Feb. 7, 1928 |
| 1,730,772 | Karolus | Oct. 8, 1929 |
| 2,194,509 | Mathes | Mar. 26, 1940 |
| 2,321,971 | Becker | June 15, 1943 |
| 2,359,649 | Kahn | Oct. 3, 1944 |
| 2,380,542 | Nolde | July 31, 1945 |
| 2,442,301 | Locke | May 25, 1948 |
| 2,483,786 | Shenk | Oct. 4, 1949 |